Sept. 4, 1956  C. H. CHANDLER  2,762,013
FLUTTER MEASUREMENT
Filed Nov. 1, 1954
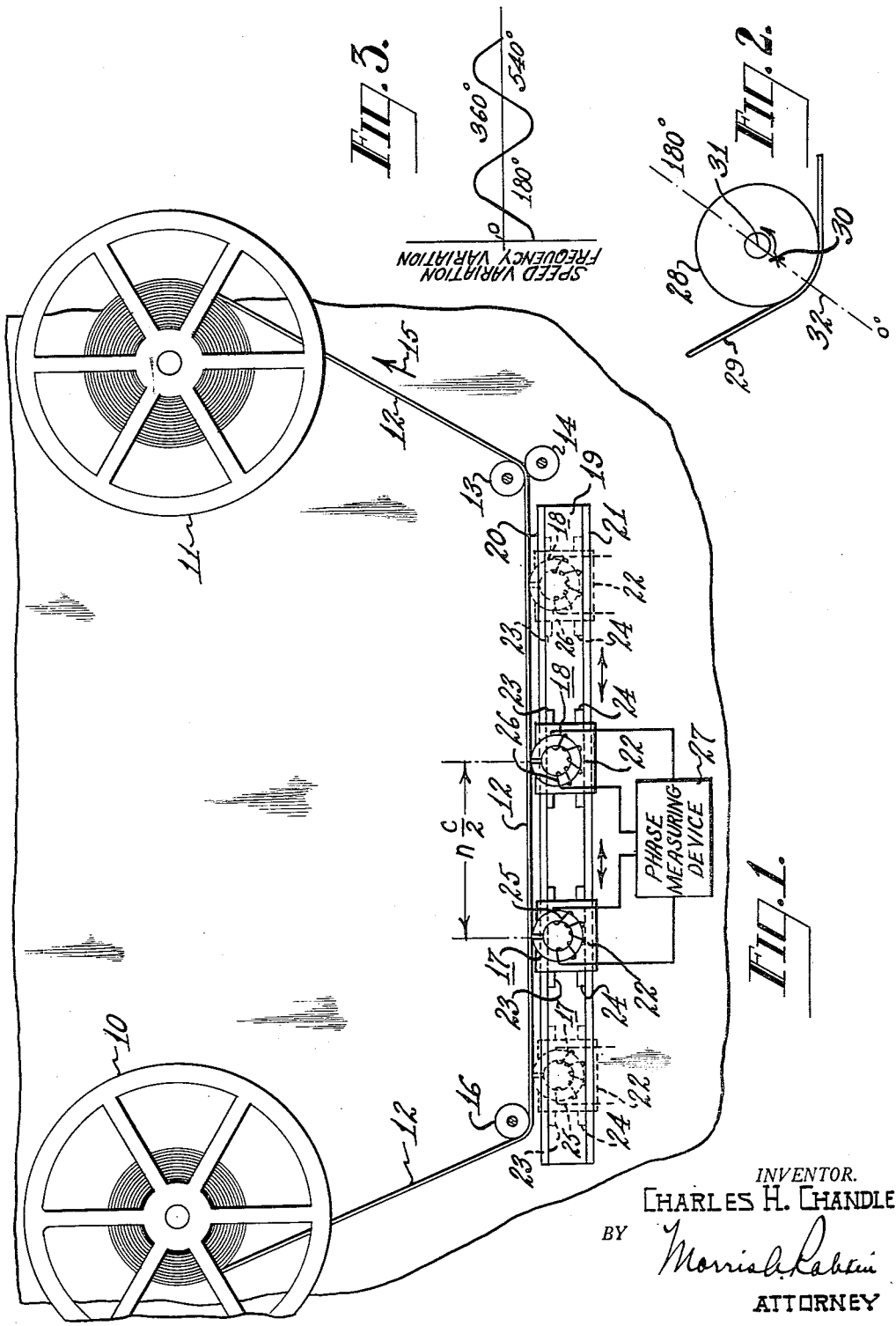
INVENTOR.
CHARLES H. CHANDLER
BY Morris A. Rabin
ATTORNEY

United States Patent Office 2,762,013
Patented Sept. 4, 1956

2,762,013

FLUTTER MEASUREMENT

Charles H. Chandler, Princeton, N. J., assignor to Radio Corporation of America, a corporation of Delaware Application November 1, 1954, Serial No. 465,874

10 Claims. (Cl. 324—70)

The present invention relates to a method and means for the detection and measurement of recorded flutter. More particularly, this invention provides a novel instrument for the detection and measurement of flutter in a recording system as well as useful and inventive methods for operating this instrument.

Flutter may be defined as momentary variations in the speed of a recording medium during the recording or reproduction of information signals. Such speed variations are a source of serious annoyance in sound recording and reproduction. The term, "flutter," and its companion term, "wow," are derived from the audible manifestations of speed variations in sound recording. "Wow" is a term that has been used to designate those momentary variations in the speed of the recording medium that take place at slow rates in the range of eight or less cycles per second, whereas, "flutter" colloquially designates those speed variations that take place at higher rates. In existing sound recording systems, flutter generally connotes speed variations in the range between eight and one hundred cycles per second. However, for purposes of the present invention, the term, "flutter," is taken to represent all forms and manifestations of speed variation in the speed of a recording medium. A recording or reproducing system may be the cause of flutter. Flutter is generally measured in terms of percent variation in speed. Thus, the deviation in speed of the recording medium divided by the average or normal speed of the medium expressed as a percentage will yield percent flutter. This measure may also be expressed in terms of deviation in frequency of a tone to the average frequency expressed as a percentage. It has been generally appreciated that flutter in excess of one percent distinguishes poor quality recording equipment from equipment of higher quality. Thus, the reduction of flutter in a recording system is essential if high quality recording and reproduction are desired.

The drive mechanism for the record medium is ordinarily a primary source of flutter. Variations in the speed of the recording medium are often due to a particular rotating member in the drive system. Consequently, the speed variations may exhibit periodicity. The rate of these speed variations may be equal to, or a multiple of, the frequency of rotation and circumference of the offending member. If a designer is to reduce the flutter by improving such a drive system, he must be able to measure his results, both intermediate and final, in an accurate and convenient manner. By means of the present invention, an offending rotating member in the drive mechanism of a recording system may be located and its effect ascertained.

Previous efforts to measure speed variations or flutter in recording systems have involved frequency discriminator arrangements, sometimes with complex heterodyne circuitry. Many existing devices use the recording system under observation to record a test signal. The same recording system is used during playback to reproduce this signal. The instantaneous deviations from the nominal recorded frequency during playback may then be recorded on a moving-paper chart. It may be seen that, regardless of the type of frequency sensitive system that is used to detect instantaneous variations in the recorded frequency, playback as well as recording imparts flutter into the signal. Such playback flutter may add to or cancel the original recorded flutter. Consequently, the playback flutter is ordinarily a combination of the recorded flutter with the playback flutter. Any flutter measurement so made is, at most, an average measurement of flutter that exists in a recording system.

Briefly, the present invention incorporates a drive mechanism for a record member. The record member is made to traverse a path along which a pair of transducing devices for reproducing a signal recorded on the record member may be located. These transducing devices are movable along the path traversed by the record member, and may be relocated at desired positions along this path. A phase measuring device is provided. Output signals from the transducing devices are applied to this phase measuring device.

A single frequency tone signal may be recorded on a record member in the recording system under observation. This record member is then played back with the aforementioned driving mechanism. The transducers consequently reproduce an electrical signal corresponding to the signal recorded on the record member. By suitably locating the transducing devices and noting the phase relationships between the electrical signals produced, the percent flutter imparted by an offending member of the recording system, or by the recording system as a whole, may be determined.

It is an object of the present invention to provide an improved method of and system for measuring recorded flutter.

It is another object of the present invention to provide an improved method of and system for measuring recorded flutter independently of playback flutter.

It is a further object of the present invention to provide an improved system for and method of obtaining a measurement of speed variation in magnetic tape recording.

It is a still further object of the present invention to provide an improved system for and method of locating a faulty member in a recording system that is a cause of flutter therein.

Other objects and advantages of the present invention will, of course, become apparent and immediately suggest themselves to those skilled in the art to which the invention is directed from a reading of the following specification in connection with the accompanying drawings in which:

Figure 1 is a top view, schematically illustrating an instrument that may be used to detect recorded flutter according to the present invention;

Figure 2 is an illustration of a rotating member in a tape recording system that may impart flutter into a recorded signal; and Figure 3 is a graph of speed and/or frequency variations of a record member in a recording system which exhibits flutter.

It may be noted that the above-mentioned figures illustrate the present invention as applied to magnetic tape recording systems. It will, of course, be understood by those skilled in the art that the principles of the present invention may be readily adapted for the measurement of flutter in other recording systems. Examples of such recording systems may be found in sound-on-film recording, magnetic wire recording, and disc recording.

Referring now to Figure 1, there are shown two spaced apart reels 10 and 11 between which extends a record member or recording medium, which is shown herein as a magnetic tape 12 for purposes of illustration. Magnetic tape is a well known recording medium. A drive capstan 13 is provided. A coupling roller 14 is adapted to pinch the tape 12 against the drive capstan 13 to cause it to be driven in the direction of the arrow 15. Simultaneously, power is supplied to the reel 11 located to the right to cause this reel 11 to rotate in a direction to take up the tape 12 as it is driven past the drive capstan 13. Another roller 16 located closest to the reel on the left causes the tape to traverse a substantially linear path between this roller 16 and the drive capstan 13. A pair of transducing devices which may preferably be magnetic reproducing heads 17 and 18 of known design are located in flux linkage relationship with the magnetic tape 12. These magnetic reproducing heads 17 and 18 are each laterally movable along a machined channel member 19 having two railings 20 and 21. The directions of this lateral movement may be to the left or to the right and typical alternative positions of the reproducing heads 17 and 18 are shown by dotted lines. The magnetic reproducing heads 17 and 18 are mounted upon block members 22. These block members 22 are set on rods 23 and 24 which are inserted into the machined channel member 19 between the railings 20 and 21 and are slidable therein. This channel 19 is arranged to lie parallel to the magnetic tape 12. The flux linking relationship between the flux reproducing heads 17 and 18 and the tape will, therefore, be substantially constant throughout all lateral movement of the reproducing heads. Provisions for moving the reproducing heads 17 and 18 within the channel 19, or a guiding member equivalent thereto, may be otherwise provided. However, manual adjustment of the position of each of the heads may be easily accomplished. Other measures for moving the reproducing heads 17 and 18 along a course that lies parallel to the magnetic tape will, of course, be apparent. For example, a lead screw arrangement such as commonly used on machine tools may be provided. Direct manual operation of the present instrument, however, is shown for the purposes of simplicity of presentation.

The magnetic reproducing heads 17 and 18 are shown provided with windings 25 and 26 thereon. The windings 25 and 26 of each of the reproducing heads have their ends connected to a phase measuring device 27. A particular phase measurement device is not essential for the purposes of the present invention. However, cathode ray tube methods may be used to determine the phase difference between the two signal voltages from each of the reproducing heads. In the performance of this method, the voltage from one of the reproducing heads may be applied to the horizontal-deflecting electrodes of a cathode ray tube oscilloscope while the signal voltage from the other reproducing head is applied to the vertical-deflecting electrodes. The well known elliptical pattern results. The exact configuration of this pattern depends upon the relative phase and amplitude of the two signal voltages from each of the reproducing heads. Other phasemeters may be alternatively used for the phase measuring device 27. Several of these phasemeters are described in a text, "Electronic Measurements," by Terman and Pettit on pages 267 to 275.

The drive capstan 13 draws the magnetic tape 12 past the reproducing heads 17 and 18 at a speed which may be substantially constant. However, exact constancy of the speed of this drive is not essential to the practice of this invention. This may be observed from the fact that speed variations in the tape simultaneously induce signals in each of the reproducing heads so that the relative phase of the signals from each of the two heads will be unchanged.

Referring to Figures 2 and 3, the principle of operation of the present invention will next be considered. In Figure 2 a rotating member 28 of a typical recording system is shown. For example, the member 28 may be similar to the roller 16 of Figure 1. A magnetic tape 29 is held against a portion of this rotating member 28. This member 28 actually rotates about a center 30 which is located off the true center 31 thereof, and is shown along an axis designated by a dot-dash line 32. The direction of rotation of this member may be counterclockwise as shown by the arrow 33. It is noticed that the tape 29 is shown centered at a minimum distance from the actual center 30 of rotation of the member 28. This position is designated as zero degrees for purposes of explanation. At this distance the linear speed of the tape will be a minimum. When the member makes a complete half rotation, the linear speed of the tape will be a maximum. This position is designated now at 180°. At two positions intermediate the points of minimum and maximum velocity of the tape, the tape will be moving at its normal or nominal velocity. Because of the circular symmetry of this rotating member, these speed variations are periodic and sinusoidal as plotted in Figure 3.

In the operation of the present invention, a single frequency sinusoidal signal or tone is recorded on a recording medium. Consequently, if a rotating member in the driving mechanism of the recording system under observation is eccentric as shown in Figure 2, or, for some other reason, rotates at a periodically varying angular velocity, a periodic and substantially sinusoidal speed variation is imparted to the magnetic tape. Such speed variation causes the tape to be propelled past the recording head in the recording system under observation with a corresponding variation in speed. Consequently, the recorded frequency will be periodically variational. These variations in frequency, therefore, exhibit a periodicity whose frequency is equal to the periodicity in the speed variations in the tape. Observation of Figure 2 reveals that this speed variation may be expressed in terms of a phase relationship. If the normal recorded frequency is designated as $f$ and the normal speed of the tape during recording is designated as $v$, the number of cycles of signal recorded per unit length on the magnetic tape is equal to $f/v$. This may be considered as $f/v$ (360°) of phase since one cycle of recorded signal has an electrical phase progression of 360°.

Assuming constant speed of the tape and a constant single frequency sinusoidal signal recorded on the tape, there will be a linear progression in the instantaneous phase difference between a selected point on the tape and increasingly distant points therefrom. The foregoing condition occurs during the absence of flutter. As has been established, however, flutter is caused by a speed variation in the recording system. This speed variation is consequently manifested in a variational, nonlinear phase progression. The instantaneous phase difference between the selected point on the tape and points increasingly distant therefrom will vary. A periodic variation in speed, as may be caused by a faulty rotating member, causes a corresponding periodic variation in phase progression.

It will be seen that a maximum differential phase relationship will occur between positions on the tape where the speed of the tape is smallest and is greatest. In Figure 2, a point of maximum speed on the tape would now be at 180° of rotation and a point of minimum speed would now be at zero degrees. This consideration leads to the conclusion that the distance between points of maximum and minimum differential phase along the tape has a relationship to an offending rotating member that may cause flutter. The sinusoidal nature of the speed variation will cause these maximum and minimum points to repeat periodically along the tape. Therefore, the minimum separation of a maximum and a minimum point will be equal to one half of the circumference of the offending member, or to an integral multiple thereof. It may also be observed that the minimum distance between two positions of minimum speed or two positions of maximum speed along the tape will be equal to the entire circumference of the offending rotating member or an integral thereof.

By locating the reproducing heads in the embodiment of the present invention, illustrated in Figure 1, so that a maximum phase difference is indicated on the phase measuring device 27, the distance between the two heads 17 and 18 will be equal to one half the circumference of the offending rotating member in the recording system under observation or to an integral multiple thereof. For example, if the circumference of the rotating member was equal to C, then the distance between the reproducing heads 17 and 18 for a maximum differential phase indication on the phase measuring device is equal to $nC/2$ where $n$ is any odd integer. Similarly the reproducing heads may be located at positions of desired separation therebetween for a minimum phase indication on the phase measuring device. The distance between the two heads will, therefore, be equal to $nC$, where $n$, in this case, may be any integer.

To find the peak percentage flutter of a recording system, a constant frequency tone signal is again recorded on the tape in the recording system under observation. The reproducing heads 17 and 18 are located to produce a maximum phase difference indication on the phase measuring device 27. The percent flutter is equal to the maximum phase deviation divided by the average phase deviation for the distance between the reproducing heads. If C is the separation distance of the reproducing heads 17 and 18 then $$C\frac{f}{v}$$

(360°) is equal to the number of degrees of phase between the two heads. Therefore, the differential phase is determined by the recorded frequency as well as the speed variation or flutter in the recording system. The measured phase difference between the two signals reproduced for any two positions of the reproducing heads 17 and 18 and for any given percent flutter will increase as the recorded frequency increases. The sensitivity of flutter measurement is consequently dependent upon the recorded frequency. By decreasing the recorded frequency a severe degree of flutter can be measured. For smaller amounts of flutter, the recorded frequency may be increased. Therefore, the sensitivity of the present invention may be kept constant, increased, or decreased as found desirable.

What is claimed is:

1. A method for the measurement of record flutter comprising the steps of playing back a record member having a recorded single frequency electrical signal thereon, reproducing said electrical signal simultaneously at two different positions along the path of travel of said record member during said first-mentioned step of playing back, and determining the phase relationship between said electrical signals reproduced at each of the said positions on said record member.

2. The method according to claim 1 including the additional step of locating said reproducing positions at selected distances of separation therebetween for a desired maximum differential measured phase relationship.

3. The method according to claim 1 including the additional step of locating said reproducing positions at selected distances of separation therebetween for a minimum differential measured phase relationship.

4. A method for the measurement of flutter in a magnetic recording comprising the steps of recording a single frequency tone signal on a recording medium, transporting said recording medium along a path, locating a pair of magnetic reproducing heads along said path and adjacent to said recording medium, deriving an electrical signal corresponding to said tone signal recorded on said recording medium from each of said magnetic reproducing heads, and detecting the phase difference between said electrical signals.

5. A method for the measurement of flutter in a magnetic recording comprising the steps of recording a single frequency tone signal on a recording medium, transporting said recording medium along a path, locating a pair of magnetic reproducing heads along said path and adjacent to said recording medium, deriving an electrical signal corresponding to said tone signal recorded on said recording medium from each of said magnetic reproducing heads, detecting the phase difference between said electrical signals, and moving each of said reproducing heads along said path until a maximum phase difference is detected for a selected distance between said heads.

6. Apparatus for detecting flutter in a magnetic recording comprising a pair of spaced-apart reels, a continuous magnetic recording medium wound on said reels upon which a single frequency tone signal has been recorded, means for driving at least one of said reels and said recording medium whereby said medium is reeled from one of said reels onto the other of said reels, guiding means for maintaining a linear path of travel of said recording medium between said reels, a pair of reproducing heads for converting said recorded signal into electrical signals, a track parallel to at least a portion of said path described by said recording medium between said reels, said reproducing heads being movably mounted on said track, a phase measuring device for detecting the phase relationships between said electrical signals produced by said reproducing heads, and means for connecting each of said reproducing heads to said phase measuring device.

7. Apparatus for detecting flutter in a magnetic recording comprising a magnetic recording medium having a single tone frequency signal recorded thereon, driving means for said recording medium, a pair of magnetic reproducing heads, each one of said heads being located at a different position along the path traversed by said recording medium when driven by said driving means, a phase measurement device, and means for connecting each of said reproducing heads to said phase measurement device.

8. Apparatus for detecting flutter in a recording comprising a record member having a single frequency signal recorded thereon, driving means for said record member, a pair of signal transducing devices for reproducing said recorded signal in the form of an electrical signal, each of said transducing devices being movably positionable along the path traversed by said driven record member, and phase measurement means for measuring the phase relationship between said electrical signals produced by said transducing devices.

9. An instrument for the measurement of flutter in recording equipment comprising a playback mechanism adapted to play back recording mediums on which a single frequency information signal has been recorded, a pair of reproducing devices adapted to convert said information signal into electrical signals, and means for measuring the phase relationship between each of said electrical signals provided by said reproducing devices.

10. A device for testing recording equipment for flutter in records recorded thereon comprising a playback mechanism for reproducing records produced on said recording equipment, said playback mechanism including a pair of pick-up transducers, each of said transducers being operably arranged to reproduce a recorded signal in the form of electrical signals at a different position along one of said records, an instrument for measuring relative phase differences between electrical signals, and means for applying said electrical signals from said transducers to said instrument.

References Cited in the file of this patent

UNITED STATES PATENTS 2,354,176   Goldsmith _____ July 18, 1944